United States Patent [19]
Harding et al.

[11] Patent Number: 4,505,775
[45] Date of Patent: Mar. 19, 1985

[54] METHOD FOR PREPARATION OF CATIONIC CELLULOSE

[75] Inventors: Margot J. Harding; Robert C. Gaines, both of Federal Way; Jerome M. Gess, Bellevue, all of Wash.

[73] Assignee: Weyerhaeuser Company, Tacoma, Wash.

[21] Appl. No.: 507,366

[22] Filed: Jun. 24, 1983

[51] Int. Cl.³ .............................................. D21C 9/00
[52] U.S. Cl. .......................................... 162/9; 162/72; 162/78; 162/88; 162/89; 162/90; 162/157.6
[58] Field of Search ............ 162/9, 10, 164.3, 164.4 S, 162/72, 157.6, 73, 157.7, 78, 183, 89, 90, 88; 210/736; 8/196, 181; 536/56

[56] References Cited

U.S. PATENT DOCUMENTS

| | | | |
|---|---|---|---|
| 2,595,935 | 5/1952 | Daniel et al. | 162/164.3 |
| 3,674,725 | 7/1972 | Aitken et al. | 162/175 |
| 3,697,370 | 10/1972 | Nagy | 162/164.3 |
| 3,854,970 | 12/1974 | Aitken | 106/210 |
| 3,930,877 | 1/1976 | Aitken | 106/287 |
| 4,029,885 | 6/1977 | Buikema | 536/50 |
| 4,146,515 | 3/1979 | Buikema | 162/164.3 |
| 4,268,352 | 5/1981 | Cosper et al. | 162/191 |

FOREIGN PATENT DOCUMENTS

| | | | |
|---|---|---|---|
| 552184 | 1/1958 | Canada | 162/164.3 |
| 74002 | 6/1977 | Japan | 162/164.3 |

Primary Examiner—Peter Chin

[57] ABSTRACT

The invention is a fibrous, cationic cellulose pulp product and the method for preparing it. A water suspension of cellulosic fiber is treated under alkaline conditions with a condensate of epichlorohydrin and dimethylamine. Up to 30 molar percent of the DMA may be replaced by a crosslinking agent such as ammonia or a lower aliphatic diamine. The process may be carried out at room or elevated temperatures. It is practical to add the condensate at one of the later alkaline stages of a bleaching process; e.g., an alkaline extraction or peroxide stage. This is most preferably done later than any chlorination or hypochlorite stages. The product shows greatly improved retention of acid and other anionic dyes. It also shows superior retention of some pigments and latices without the need for other cationic aids. In some cases a small amount of alum appears to have a synergistic retention effect with the cationic pulp product when used with titanium dioxide and certain anionic latices.

12 Claims, 9 Drawing Figures

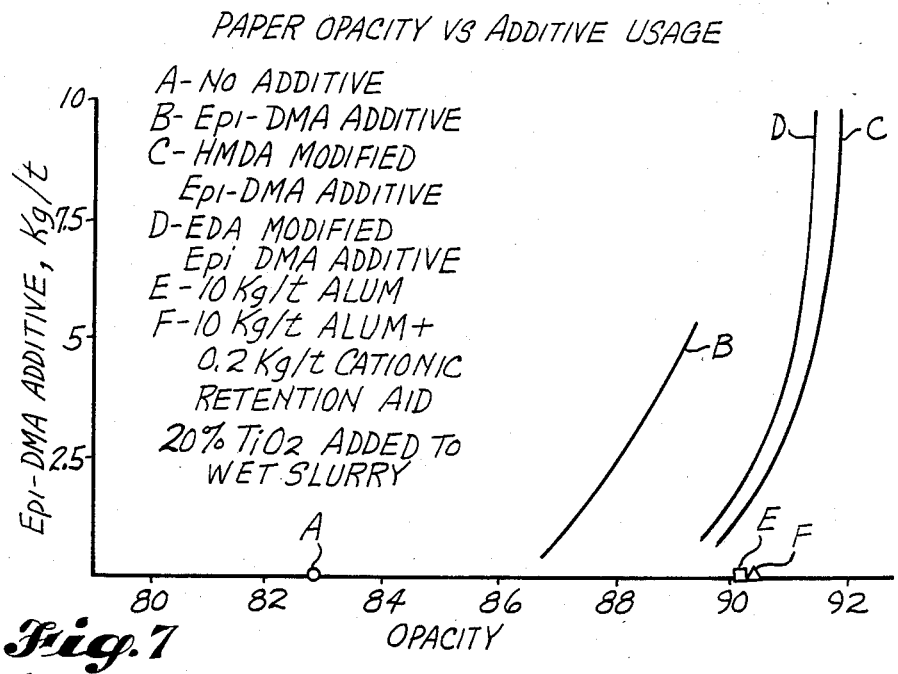
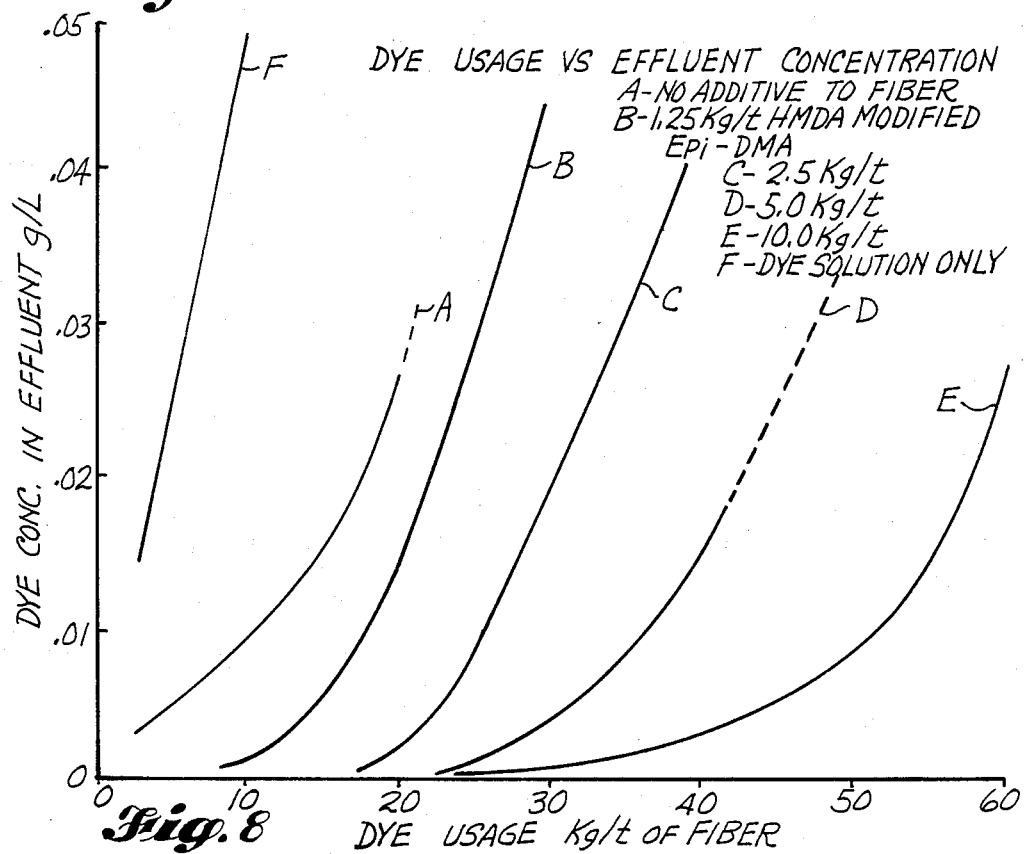

METHOD FOR PREPARATION OF CATIONIC CELLULOSE

BACKGROUND OF THE INVENTION

The present invention is a fibrous, cationic cellulose pulp product and the method for preparing it. The product is especially advantageous in papermaking for its improved retention of certain dyestuffs and filler materials.

The surface of cellulose fibers is normally slightly anionic in nature due to the presence of carboxyl and carbonyl groups introduced during the pulping and bleaching process. This negative charge is responsible for a number of undesirable effects in papermaking. Principal among these is the tendency of the longer fibers to repel fine cellulose particles which result from refining and the similar tendency to repel many additives such as fillers, pigments, dyes, and sizes, many of which also bear negative charges. As a result, these fine particles tend to go into the white water during sheeting where they represent an economic loss and a pollution problem. In response to this problem, alum has traditionally been added to adjust the electrical charge of surfaces to which it is adsorbed. However, alum is not very efficient; therefore, relatively large amounts are required. This produces an undesirable, relatively highly acidic environment both in the sheeting process and in the final paper product. In the papermaking process, this acidity tends to corrode equipment. In paper it results in relatively rapid loss of physical properties such as tear strength and fold resistance.

A number of routes have been explored using materials besides alum to overcome the anionic nature of cellulose fibers. One such route, which has seen commercial use for approximately 30 years, has been the use of additives which are cationic in nature; e.g., cationic starch. These additives are attracted to the anionic cellulose and serve to modify or neutralize the electrical charge so that the fibers have less tendency to repel anionic additives. Today a relatively wide variety of cationic papermaking additives are available. These include materials for improving drainage rate, reducing fines and pigment loss, and increasing wet strength. Cationic additives also make the use of less acidic sizing agents possible. Alkyl ketene dimers are such a sizing agent applied in the pH range of 6-8. Articles to McKenzie, *Appita* 21(4): 104-116 (1968) and to Moore, *Tappi* 58:99-101 (1975) are informative of the state of the art.

Another route to overcoming the anionic nature of cellulose fibers has received considerable research although no products have yet evolved which have been of commercial importance. This approach has been to make the fibers themselves cationic in nature, usually by reaction with a material that introduces positively charged nitrogen atoms into a substituent side chain. Uwatoko, *Kagaku Kogyo* (Japan) 25 (3):360-362 (1974) briefly summarizes the state of the art in regard to cationic fibers. Uwatoko lists six major approaches that have been taken. Without putting them in any chronological order, these are as follows: the first method introduces side chains containing a tertiary nitrogen atom. These side chains are attached to the cellulose molecule at the hydroxyl groups as ethers. One product of this type which has received considerable study is the quaternized diethylaminoethyl derivative of cellulose. A second route to the preparation of cationic cellulose is the reaction of cellulose in the presence of sodium hydroxide with ethanolamine, aqueous ammonia or melamine. A third process is the reaction between cellulose and a material such as 2-aminoethyl sulfuric acid in the presence of sodium hydroxide. Another product has been formed by iminating an aminated cellulose by reaction between the aminated cellulose and ethylene imine. An approach which has received considerable study is the reaction of various trimethyl ammonium salts. Of particular importance has been glycidyl trimethyl ammonium chloride reacted with cellulose in the presence of a catalytic amount of sodium hydroxide. A related approach has been the reaction of 2-chloroethyldiethyl amine with alkali cellulose. This product is then quaternized with methyl iodide in anhydrous alcohol. Finally, Uwatoko describes a modified cellulose described in more detail in *J. Soc. Fiber Sci. Technol.* (Japan) 30 (5/6):T313-314 (1974). In this process cellulose is reacted with a solution of sodium acid cyanamid at a concentration of 50-200 g/L at a pH in the range of 10-13 and temperature of 10°-40° C. for 4-24 hours.

One approach not specifically discussed by Uwatoko is the reaction of cellulose with a mixture of epichlorohydrin and a tertiary amine with cellulose in the presence of aqueous sodium hydroxide. This process is discussed by McKelvey and Benerito in *J. Appl. Polymer Sci.* 11:1693-1701 (1967). Paschall, in U.S. Pat. No. 2,876,217 describes the use of this process to make a granular cationic starch useful as a papermaking additive. Benerito et al., *Anal. Chem.* 37:1693-1699 (1965) describe in detail the production of quaternary ammonium ethers of cellulose by the reaction of diethylaminoethyl cellulose with either methyl iodide or ethyl bromide under completely anhydrous conditions.

Kaufer et al., *Papier* (Darmstadt) 34(12):575-579 (1980) describes several applications of cellulose made cationic by the reaction of glycidyl trimethyl ammonium salts. These authors also teach the usefulness of β-methacryloxyethyltrimethyl ammonium chloride as a cationizing agent.

Krause et al., *Papier* (Darmstadt) 35(IOA):33-38 (1981) building on the work of Kaufer and his coworkers, show the superiority of cationic pulps in retaining alkyl ketene dimer sizing materials as opposed to the conventional use of cationic starches as retention aids.

In West German Pat. No. 2,817,262, John et al. show that only part of the fiber in a papermaking stock needs to be cationized in order to achieve significant benefit.

Stone et al., in Canadian Pat. No. 838,684 teach the preparation of a wide variety of quaternary nitrogen-containing cellulose ethers which function as cationic materials.

Lewis et al., in U.S. Pat. No. 3,694,393 show the treatment of cellulose with the reaction product of epichlorohydrin and dimethylaminoethyl methacrylate.

There appear to be a number of reasons why a cellulose pulp having cationic substituents has never appeared commercially in the marketplace as a papermaking fiber. One of the principal reasons is the expense. In many cases the raw materials themselves are very expensive. Along with this is the problem that the reaction conditions of the cellulose with the substituent materials are such as to cause the cost of the product to be greatly elevated. Many of the cationic cellulose materials produced by straightforward chemical reaction are not of fibrous nature. This is a problem with relegates them to the nature of an additive in papermaking as opposed to use as a primary fiber. A number of the products which are fibrous must be produced by grafting reactions. Here free radical sites are induced in the cellulose chains by means such as ceric ion activation or high energy irradiation. An appropriate polymerizable monomer having vinyl unsaturation is then coupled to the cellulose and polymerized in the presence of a free radical initiator. The overall result has been a group of products which are either technically unsuitable or far too expensive for general use.

Cationic starches, which have been available commercially for over 30 years, do have some relationship to the cationic celluloses just described. One who sits on the edge of this particular scientific art might question why the processes used for the preparation of cationic starches have not successfully been applied to cellulose fibers. There is a ready answer. In the first place, most of the cationic starches are modified in physical nature by cooking or partially cooking during the chemical reaction which introduces cationic sites. There is not any need for these products to retain their original physical form. A second reason is that cationic starches are used in relatively small percentages in papermaking. Therefore, they form only a small portion of the ultimate product. This fact makes their relatively high costs more tolerable to the papermaker. While there is no need to review all of the extensive technical literature relating to cationic starches, a few recent patents bear some relationship to the present invention. Aitken, U.S. Pat. No. 3,674,725 describes a product in which a polyepichlorohydrin is modified with an amine, preferably trimethylamine. This product can then be reacted with a starch under strongly alkaline conditions. The same inventor, in U.S. Pat. Nos. 3,854,970 and 3,930,877 teaches an approximately equal molar composition of epichlorohydrin and dimethylamine reacted under alkaline conditions and then acidified to produce a quaternary ammonium salt. The preferred compositions have 10-20% ammonia substituted for an equivalent of the dimethylamine. These condensates can be used to prepare liquid cationic starches by reaction under rather strongly alkaline conditions with partially hydrolyzed starches. Buikema, U.S. Pat. No. 4,029,885, shows the use of those starches for sizing paper. Buikema et al., U.S. Pat. No. 4,146,515 treat a lightly oxidized starch with an epichlorohydrin-dimethylamine condensate at about 60°-80° C. for one hour. This product is subsequently acidified to make an amine salt. Cosper et al., U.S. Pat. No. 4,268,532, use a dimethylamine-epichlorohydrin polymer with a second polymer (which may or may not be anionic) for retaining starch in repulped broke. It is interesting that these inventors do not appear to have considered the possibility of reacting their epichlorohydrin-dimethylamine condensate with cellulose to produce a product which could be both fibrous and cationic in nature.

The present invention describes a cationic cellulose made by reaction, under mildly alkaline aqueous conditions, of cellulose fibers with one of a group of condensates based on the reaction product of epichlorohydrin and dimethylamine. The reaction conditions and nature of the materials involved is such that a fibrous product results which a little more expensive to manufacture than the cellulose itself.

SUMMARY OF THE INVENTION

The present invention is a fibrous cationic cellulose product and a process for making it which comprises an additive of cellulose with a material which is either a condensate of epichlorohydrin and dimethylamine or a condensate of this type which has been further modified by replacing a portion of the dimethylamine with a cross-linking agent which may be ammonia or a primary aliphatic diamine of the type $H_2N—R—NH_2$, where R is an alkylene radical having from two to eight carbon atoms.

The proportions of epichlorohydrin and dimethylamine may vary within the range of about 0.8 to 3 moles of epichlorohydrin for each mole of dimethylamine. The preferred condensates will be approximately equal molar in proportion. Ammonia and the primary aliphatic diamines serve to act as cross-linking agents for the additive condensates. Further, their use increases the number of tertiary nitrogen atoms which may be quaternized to provide sites for positive charges. Up to 30 molar percent of the dimethylamine may be replaced by ammonia or the aliphatic diamine in the condensation process. In general, it is preferred that the molar percentage of ammonia or aliphatic diamine be in the range of 10-20%. Preparation of condensates suitable for use in the present invention is described in U.S. Pat. No. 3,930,877 to Aitken.

It should be considered within the scope of the invention to use mixtures of any of the above condensates.

While the cationic cellulose product of the present invention is described as an "additive" of cellulose with the epichlorohydrindimethylamine condensate, it will be understood by those skilled in the art that the condensate may be covalently bonded to the cellulose by virtue of pendant epoxy moieties which react by etherification with the hydroxyl groups on the cellulose molecules. Alternatively, the condensates may be hydrogen bonded or otherwise attached to the cellulose. In all probability both mechanisms are present.

Among the modifying agents which serves as potential cross linkers for the condensate, ethylene diamine and hexamethylene diamine are preferred materials.

The additive material may be used effectively in relatively high amounts. Typically usage will be in the range of 0.5-20 kg/t (1-40 lbs/t). The preferred range of usage is about 1-10 kg/t. These usages are somewhat nominal and are based on manufacturer specified solids percentages in the aqueous solutions of condensates sold commercially. These solids percentages are only appropriate for active epichlorohydrindimethylamine condensate since they are based on raw materials charged to the synthesis reactor. This approximation procedure is necessary because of the great difficulties in analyzing the condensate solutions without inducing decomposition of the product. In subsequent examples, calculations will assume that the percent solids as specified by the condensate manufacturer are equivalent to percent active epichlorohydrin-dimethylamine condensate.

One of the unique aspects of the present invention is the method of making the cationic cellulose product. It has been discovered against all expectations that it is only necessary to add an aqueous solution of the additive to a suspension of cellulose in water which has had the pH raised into the alkaline range, preferably to the range of approximately 10.0-10.5, and to agitate this mixture for 30 minutes or less at room or elevated temperature. Most surprisingly, the process may be carried out at an alkaline stage in the bleaching process, preferably after any hypochlorite treatments, whereupon the resulting additive appears resistant to further bleaching operations. In the usual bleaching schedule for a kraft pulp, the condensate is conveniently added during an alkaline extraction stage or hydrogen peroxide stage during the latter part of the bleaching sequence. In this way, no changes in the bleaching sequence are necessary nor are any additional steps required to produce the cationic additive. This discovery flies in the face of expectations that the oxidizing environment in bleaching stages during or following the addition of the condensate would either remove it or destroy its effectiveness.

It is thus an object of the present invention to provide a fibrous cellulosic product which is cationic in nature.

It is another object of the invention to provide a cationic cellulose product with improved effectiveness in retaining anionic papermaking additives.

It is a further object to provide a cationic cellulose which has extremely high retentivity of acid dyes.

It is another object of the invention to provide a simple and inexpensive process for the preparation of a fibrous cationic cellulose product.

It is still another object to provide a process for the manufacture of a cationic cellulose product which can be carried out during an alkaline bleaching stage and which does not require a separate process step.

These and many other objects will become readily apparent to one skilled in the art upon reading the following detailed description of the invention taken in conjunction with the figures.

BRIEF DESCRIPTION OF THE DRAWINGS

FIGS. 6 and 7 are graphs similar to FIGS. 4 and 5 but in which a different cationic additive was used.

FIGS. 8 and 9 are graphs showing the effectiveness of cellulose fibers treated with various amounts of cationic additive in adsorbing an acid dye from an aqueous solution.

DETAILED DESCRIPTION OF THE PREFERRED EMBODIMENTS

Figure 1:
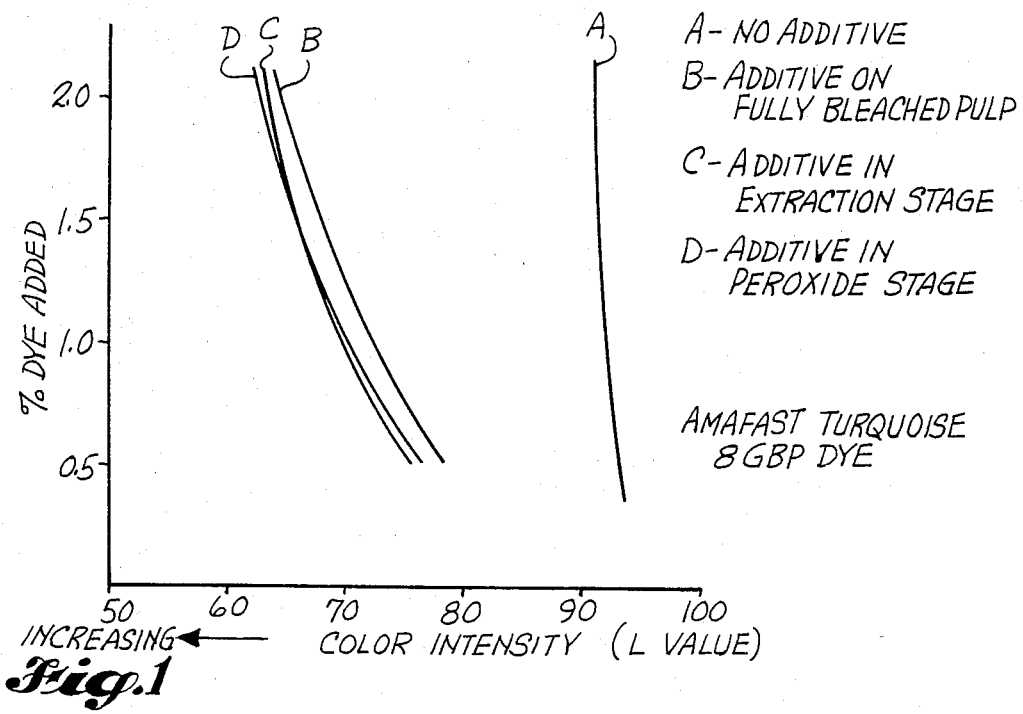
FIG. 1 is a graph showing the relationship between the point in the bleach sequence at which the cationic additive was combined with the cellulose and the color intensity of the dyed product.

The cationic cellulose product of the present invention is readily prepared by adjusting the pH of a water slurry of cellulose to a pH which is preferably about 10.5 and then adding the desired amount of an aqueous solution of the epichlorohydrin-dimethylamine (Epi-DMA) condensation product. Temperature is not critical. The system works equally well at room or elevated temperatures. The slurry is agitated for about 10–30 minutes whereupon the resulting treated pulp is drained and washed. From this point it may either be sheeted or sent in the wet state for further processing. It is surprising and totally unexpected that a cationic cellulose product could be made under the mild conditions outlined above. This is especially so in view of the harsh (5% alkali and near boiling temperatures) outlined in U.S. Pat. No. 3,854,970 for preparation of cationic starches from Epi-DMA condensation products similar to those used in the present invention.

What is also surprising and unexpected about the process alternatives for making the cationic cellulose product is that the Epi-DMA condensation product can be added at any later alkaline stage of a pulp bleaching sequence where the pH is preferably about 10 or higher. The stage at which the condensate is added should preferably be later in the bleach sequence than any hypochlorite stage. The presence of highly oxidizing conditions in the stage at which the condensation product is added, or in subsequent bleaching stages, appears to make little or no difference. It also makes no difference whether the bleaching stage is one carried out at ambient or elevated temperatures.

The discovery that the Epi-DMA condensation product may be added during an alkaline bleaching step is of great importance to the process economics. For the first time it enables a cationic cellulose product to be made without any additional process steps over those normally required for making a bleached fiber. The only process expense is the cost of the condensation product. In the present case these products are articles of commerce made from readily available and relatively inexpensive commodity chemicals. They are used only in modest amounts in the range of 0.5–20 kg/t. Process efficiency, in terms of condensation product which actually bonds to the cellulose, ranges from essentially 100% at the low end of usage to over 80% at high end.

The following examples give detailed instructions on the best mode known to the inventors of making and using the products of the invention.

EXAMPLE 1

Bleached, spruce kraft pulp (Sample 1) was obtained from a pulp mill. Samples having 15.5 g of dry fiber were slurried in water at 2% consistency (759.5 g total water). The pH was adjusted to 10.5 with NaOH and 0.31 g of a 50% solution (10 kg/t on an active material basis) of an unmodified Epi-DMA condensate (Nalco N-7655 Nalco Chemical Co., Oak Brook, Ill.) was added to the slurry. Temperature of the slurry was 20°–23° C. After agitation for about 30 minutes, the slurry was diluted to about 0.5% consistency and a handsheet was made. The sample was not washed other than by dilution during sheeting. Kjeldahl nitrogen content of the treated pulp (Sample 2) was 0.046% indicating an add-on of 8.7 kg/t and a retention efficiency of about 87%. Nitrogen content of the condensate was measured as 5.3% on an as received (50%) basis. The untreated pulp control had a nitrogen content of less than 0.001%.

EXAMPLE 2

A sample of partially bleached Douglas-fir kraft pulp was taken from the bleach plant of a pulp mill after the third of a five or six-step bleach sequence. The normal mill bleach sequence consists of a first stage chlorination using 75 kg/t $Cl_2$ for about 30 minutes at a temperature of about 32° C. At the end of the bleach stage the pH is approximately 1.8.

After washing following the chlorination, the pulp was given a treatment using about 37.5 kg/t NaOH and about 15 kg/t sodium hypochlorite at a pH in the range of 10–11 and temperature in the 60°–71° C. range for about one hour. While this is usually referred to as a "neutral hypochlorite" stage, it is essentially an alkaline extraction step with hypochlorite being present.

Following washing after the alkaline hypochlorite treatment, the pulp was given a hypochlorite bleach using 15 kg/t sodium hypochlorite at about 40° C. for approximately one hour. The pH toward the end of the step was maintained at a level slightly above 9 by the addition of caustic as necessary.

While the pulp samples for laboratory treatment were taken on the washers following the hypochlorite step, the rest of the steps in a normal mill sequence will be described here.

Alkaline extraction follows next, using about 10 kg/t NaOH at 60°–71° C. for about 30–60 minutes. The pH in this treatment is about 10.5 making it an ideal point in a plant bleach sequence for the addition of the Epi-DMA condensate product to the pulp.

After washing following extraction, the pulp is given a chlorine dioxide treatment using about 7.5 kg/t $ClO_2$ with about 2 kg/t NaOH added later in the step for pH control. The pH at the end of the treatment will be about 3.5. This is a hot treatment with temperatures usually in the 65°–82° C. range, typically about 70° C. The time will vary between 30 minutes and 3½ hours although ½ to 1 hour is most common.

For many pulp products the chlorine dioxide stage is the final bleach treatment. If a customer wishes a whiter product, from 2–4 points additional brightness can be gained by using a peroxide treatment following the chlorine dioxide stage. This was about 1.5 kg/t of hydrogen peroxide at about 71° C. with the pH raised by NaOH to about 10.5. Again, time is variable ranging from 30 minutes to 6 hours, more typically about 1 hour.

While a detailed description of various pulp bleaching sequences is not of importance to the present invention, the reader wishing more detail can refer to several standard pulping texts and to U.S. Pat. Nos. 4,303,470 (Meredith, et al.) and 4,298,426 (Torregrossa, et al.).

Using the pulp samples taken in the pulp mill after the hypochlorite stage, a series of samples was made in which two additional bleaching stages were completed in the laboratory. Epi-DMA condensate (Nalco 7655) was added at the alkaline extraction step. In each bleach trial 30 g of O.D. pulp was used. The following table shows the conditions and results of the trials.

TABLE I

| Laboratory Final Stage Bleaching | | |
|---|---|---|
| Sample No. | 3 | 4 |
| Extraction Stage | | |
| NaOH, % | 0.9 | 0.9 |
| (1)Epi-DMA, % | — | 1.0 |
| Time, min. | 45 | 45 |
| Temp. °C. | 70 | 70 |
| Initial pH | 12.4 | 12.45 |
| Final pH | 11.9 | 11.75 |
| Chlorine Dioxide Stage | | |
| $ClO_2$, % | 0.85 | 0.85 |
| NaOH, % | 0.34 | 0.34 |
| Time, min. | 180 | 180 |
| Temp, °C. | 70 | 70 |
| Final pH | 3.3 | 3.1 |
| Properties | | |
| Kjeldahl N, % | <0.001 | 0.041 |
| (2)Epi-DMA Retention, % | — | 78 |

TABLE I-continued

| Laboratory Final Stage Bleaching | | |
|---|---|---|
| Sample No. | 3 | 4 |
| (3)Dye Intensity, L Value | 91.4 | 69.5 |

(1)Nalco 7655. Calculated on active material basis. All percentages are based on pulp.
(2)Retention as % of material charged.
(3)Based on treatment in aqueous slurry with 1% Amafast Turquoise 8GPB dye. (Ciba-Geigy, Greensboro, North Carolina). Color intensity expressed as "L Value" on Hunter Colorimeter. Lower values indicate more intense color.

EXAMPLE 3

Another bleached pulp sample was taken from the pulp mill bleach plant following the chlorine dioxide stage but prior to a hydrogen peroxide treatment. The peroxide stage was completed in the laboratory in similar fashion to the bleaching done in Example 2. The following table shows conditions and results.

TABLE II

| Sample No. | 5 | 6 |
|---|---|---|
| Extraction Stage | | |
| $H_2O_2$, % | 0.12 | 0.12 |
| NaOH, % | 0.10 | 0.10 |
| Na Silicate, % | 0.6 | 0.6 |
| (1)Epi-DMA, % | — | 1.0 |
| Time, min. | 150 | 150 |
| Temp. °C. | 65 | 65 |
| Initial pH | 10.5 | 10.3 |
| Final pH | 10.3 | 10.0 |
| Properties | | |
| Kjeldahl N, % | <0.001 | 0.044 |
| (2)Epi-DMA Retention, % | — | 83 |
| (3)Dye Intensity, % dye | 91.9 | 70.2 |

Please refer to Table I for footnotes.

EXAMPLE 4

Dyeing tests were made on the product of Sample Nos. 1, 2, 4 and 6 of Examples 1–3. Sample 1 is an untreated fully bleached kraft pulp. Sample 2 is a fully bleached pulp treated with 10 kg/t of Epi-DMA condensate. Sample 4 had 10 kg/t of Epi-DMA added at the caustic extraction stage prior to the chlorine dioxide stage. Sample 6 had 10 kg/t of Epi-DMA added at the final peroxide bleach stage.

In order to study dye retentivity of the cationic cellulose product, 5 g dry weight of pulp was slurried at 1% consistency in room temperature tap water and run for two minutes in a high shear blender. The dye was added and mixing was continued as necessary to disperse the dye in order to simulate light refining. Handsheets were made of the dyed fiber and color intensity was then measured on a Hunter Colorimeter, Type D-25A (Hunter Laboratories, Research Triangle Park, North Carolina).

Tests were made using 0.5, 1.0, 1.5 and 2.0%, based on dry pulp weight, of Amafast Turquoise 8GBP, a sulfonated pigment made by Ciba-Geigy Corp., Greensboro, N.C. Results of the tests are shown graphically in FIG. 1. The untreated fiber showed essentially no gain in color intensity with increase in dye concentration. The three treated samples showed a relatively linear increase in intensity with increasing dye usage. Differences between the three samples treated with the Epi-DMA condensate are probably not statistically significant. This confirms the surprising and unexpected results of earlier tests indicating that the bleaching treatments given to the treated pulp were not deleterious.

EXAMPLE 5

In order to determine the effect of the amount of Epi-DMA additive used, a bleached kraft market pulp, the mill sheeted product of Example 1, was obtained and reslurried in water at 2% consistency. Sodium hydroxide was added to adjust pH to about 10.5. Samples were then made using 1, 2, 5 and 10 kg/t Epi-DMA additive (Nalco 7655), calculated on an active material basis. The resulting products were dyed, using the procedure of Example 4, with 0.5, 1.0, 1.5 and 2.0%, based on dry pulp, of Pergacid Blue Black B and Pergacid Orange 5R, acid dyes also available from Ciba-Geigy. Additional sets of dyed samples were made with untreated pulp using 10 kt/t of alum as a dye fixative. Results with the blue dye are shown graphically in FIG. 2 and with the orange dye in FIG. 3.

Results confirmed the general trend established in the previous example, although using the present dyes all of the samples treated with the Epi-DMA condensate showed higher color intensities than those in the previous series. The best results using alum with 2.0% dye were about equal to the color intensities of fiber treated with only 2 kg/t additive and only 0.5% dye. There does not appear to be any advantage of the highest additive usage over the results achieved at 10 kg/t.

EXAMPLE 6

Bleached kraft pulps having 1, 2 and 5 kg/t of Epi-DMA additives, calculated on an active material basis, were used in an experiment to determine whether the increased cationicity improved pigment retention. To this end a sodium tetrapyrophosphate dispersed rutile-type titanium dioxide was added to a slurry of the fiber in amounts of 5, 10, 15 and 20% based on the weight of dry fiber present. A slurry of 10 g dry weight fiber in 750 mL of water was refined in a high shear blender for three minutes. Then 2 g of titanium dioxide was added and refining was continued for an additional minute. The slurry was further diluted with water and handsheets were made.

An untreated control series was run as were series using 10 kg/t alum and 10 kg/t alum with 0.2 kg/t Reten 210 retention aid, a trademarked, low cationic charge density polyacrylamide product made by Hercules, Inc., Wilmington, Del.

Figure 4:
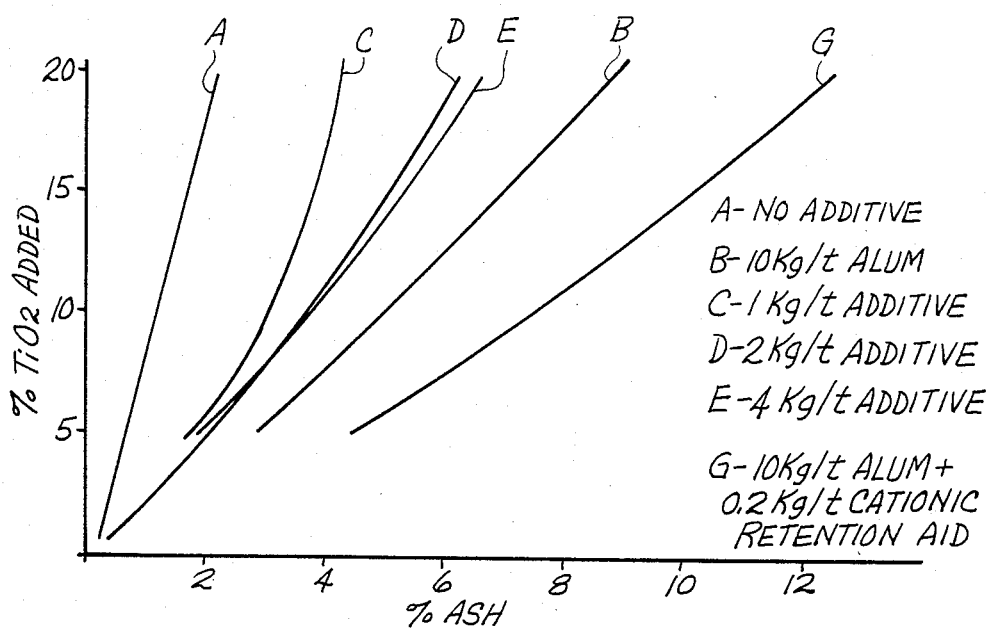
FIG. 4 is a graph showing the amount of titanium dioxide retained versus that added for a family of cationic cellulose products treated with different amounts of additive.

Titanium dioxide retention of the additive treated samples, as measured by ash content, was significantly improved over untreated pulp but was inferior, especially at higher pigment usages, to the simple use of alum. Untreated fiber with both alum and retention aid was markedly superior to any of the other treatments (FIG. 4).

Figure 5:
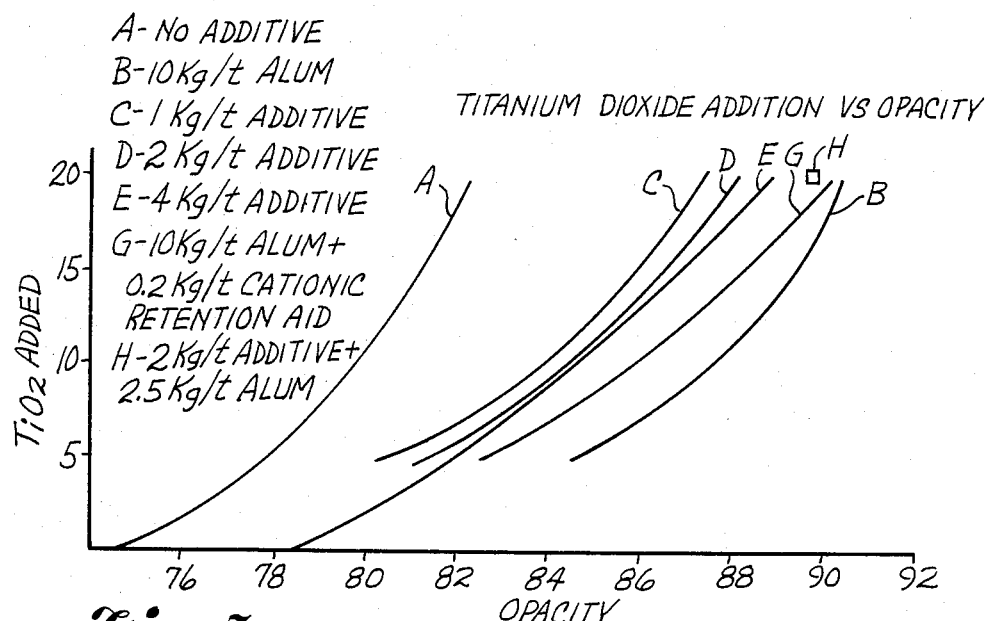
FIG. 5 shows opacity of the ultimate paper products plotted against the amount of titanium dioxide added to a family of cationic cellulose products having different amounts of additive.

Quite surprisingly, the Epi-DMA treated series fared much better when sheet opacity was compared with the amount of pigment used (FIG. 5). Opacity, as opposed to retention, is actually a much better measure of pigment efficiency. Differences between the Epi-DMA treated fiber and the alum or alum plus retention aid samples were relatively minor. When fiber treated with 4 kg/t of additive was used with a small amount of alum (2.5 kg/t) opacity values were equal to the best obtained by any means for the one level of titanium dioxide tested.

EXAMPLE 7

Another series of samples was run using a crosslinked cationic additive in which a portion of the dimethylamine was replaced by hexamethylene diamine (HMDA) in the epichlorohydrin-dimethylamine condensation product. This product is available as Nalco N-7135 from Nalco Chemical Co. Bleached kraft fiber was treated with 1.25, 2.5, 5 and 10 kg/t, active material basis of the additive condensate in the manner taught in Example 1. This fiber was compared with samples of fiber treated with 1, 2 and 5 kg/t of the unmodified Epi-DMA condensate. Additionally, samples of untreated pulp were used with 10 kg/t alum and 10 kg/t alum with 0.2 kg/t Reten 210 retention aid.

The fiber samples were treated as described in Example 6 using 20% sodium tetrapyrophosphate dispersed titanium dioxide based on dry fiber. Retention results are shown graphically on FIG. 6 and opacity values on FIG. 7.

Figure 6:
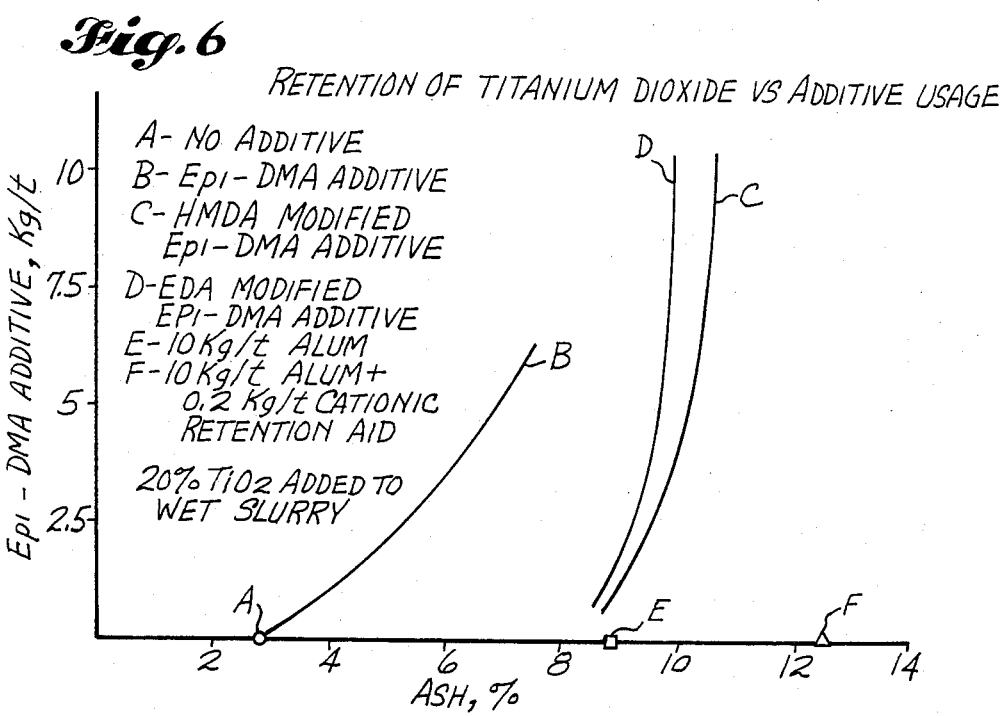

The HMDA modified Epi-DMA is superior to the unmodified Epi-DMA condensate in pigment retention (FIG. 6). It is also superior to the use of alum by itself. Only the combination of alum and the cationic polyacrylamide retention aid exceeded the treated modified condensate in titanium dioxide retention efficiency. There was little advantage seen in using more than 10 kg/t of the HMDA modified condensate.

As noted in the previous example, opacity is actually a better measure of pigment efficiency than is pigment retention. By this measure, as is seen in FIG. 7, even very low usages of the HMDA modified Epi-DMA condensate perform in superior fashion to any of the other treatments. Again, most of the benefit appears to be gained below 10 kg/t addition rate of the condensate.

EXAMPLE 8

An additional series of samples was made in which the fiber was treated with 1.2, 2.5, 5 and 10 kg/t of an ethylene diamine (EDA) modified Epi-DMA polymer (Nalco N-8100). Titanium dioxide retention tests were made as described in Examples 6 and 7, again using 20% $TiO_2$ based on fiber weight.

Pigment retention and opacity results are seen on FIGS. 6 and 7 respectively. The EDA modified condensate is marginally poorer than the hexamethylene diamine (HMDA) modified condensate although it results in opacities better than those obtained with alum and a retention aid.

EXAMPLE 9

Samples were made in similar fashion to the cationic pulps described in Example 1 except that an ammonia crosslinked Epi-DMA condensate (Nalco 7607) was used.

Two 20 g dry weight samples of spruce kraft pulp were added to about 750 mL of water and run for 5 minutes in a high shear blender to simulate refining. The pH was adjusted to 10.5 with NaOH. To one sample was added 0.1 g of the 35% active material condensate to achieve an equivalent usage of 1.75 kg/t. Twice this amount was added to the other sample for a 3.5 kg/t equivalent usage. The treated fiber was allowed to stand for 30 minutes at room temperature, drained and washed to pH 7, and made into handsheets.

The handsheets were sampled and 3 g dry basis of the cationic pulp was slurried in 400 mL of water and run for 2 minutes in the high shear blender. Amafast Bond Blue dye was added equivalent to 40 kg/t of pulp. The samples were diluted to 900 mL and small handsheets made.

While colorimetric readings were not made, the dyed samples were compared visually with a dyed untreated control sample. The higher color intensity of the cationic fiber was immediately apparent. This was reflected in the much lower color level of the white water of the two treated samples as compared with the white water from the untreated pulp.

Nitrogen contents of the samples treated with 1.75 and 3.5 kg/t of $NH_3$ modified Epi-DMA were 0.021% and 0.025% respectively, indicating about 91% and 54% retention of the polymer.

EXAMPLE 10

Trials were made to see if the cationic cellulose products of the invention were effective in retaining anionic latices. One product was made as in Example 1 using 10 kg/t of Epi-DMA condensate. A second product was made using 5 kg/t of the hexamethylene diamine (HMDA) modified condensate as taught in Example 7. Both usages were calculated on an active material basis. The treated samples were slurried in water and varying amounts of self-crosslinking acrylic emulsion latex (UCAR 872, Union Carbide Corp., New York, N.Y.) were added. Handsheets were then made from the fiber latex mixtures. In addition to the two treated materials, trials were run on untreated pulp and untreated pulp with alum in ranges from 2.5 to 12.5 kg/t alum.

Untreated fiber, untreated fiber with alum and the fiber treated with 10 kg/t Epi-DMA were ineffective at retaining latex which was essentially all lost with the white water. Fiber treated with HMDA modified condensate showed excellent latex retention, as measured by increase in sheet weight.

When small amounts of alum were added to the mixture of Epi-DMA treated fiber and latex, the latex was effectively retained at alum usages of 5 kg/t and greater. Alum at usages of about 2.5 kg/t also improved latex retention of fiber treated with HMDA modified polymer although not to the same extent as with the Epi-DMA treated fiber. With the HMDA modified sample, there did not appear to be significant advantage in using alum in amounts greater than 2.5 kg/t.

It is apparent that the particular additive used will have some effect on the final properties of the fiber. An optimum additive for dye retention might not be optimum for pigment retention. However, in combinations with small quantities of a supplementary cationic additive, such as alum, a synergistic effect is noted and an improved result is achieved that is not possible with either the treated fiber or the cationic additive standing by themselves.

EXAMPLE 11

Figure 2:
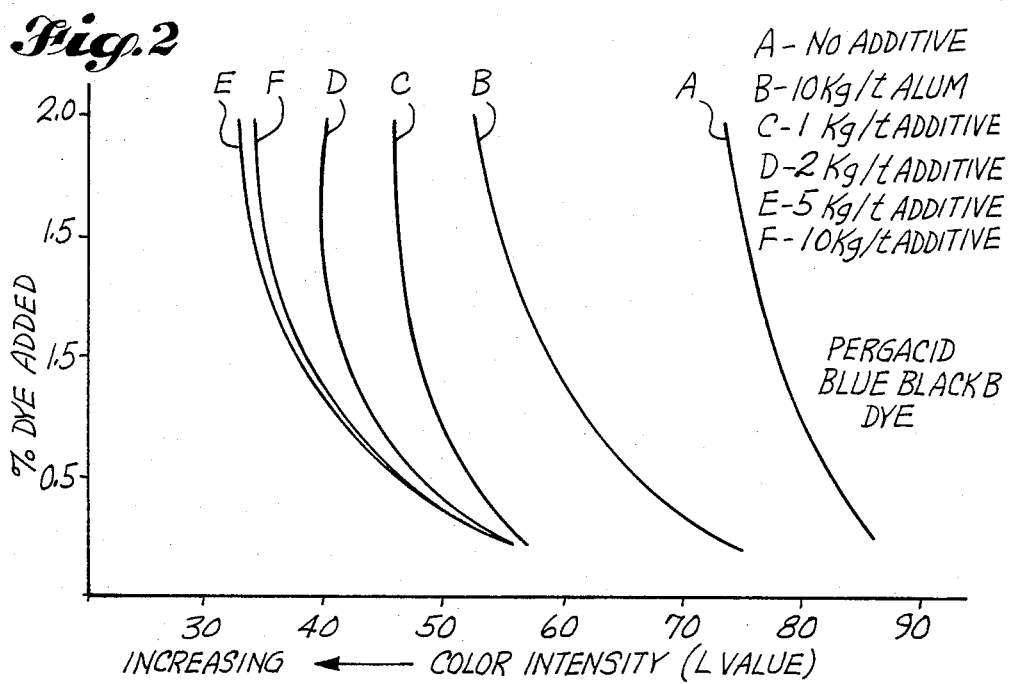
FIGS. 2 and 3 are graphs showing the color intensity versus the amount of dye used for a family of cationic cellulose products having different amounts of additive.
Figure 3:
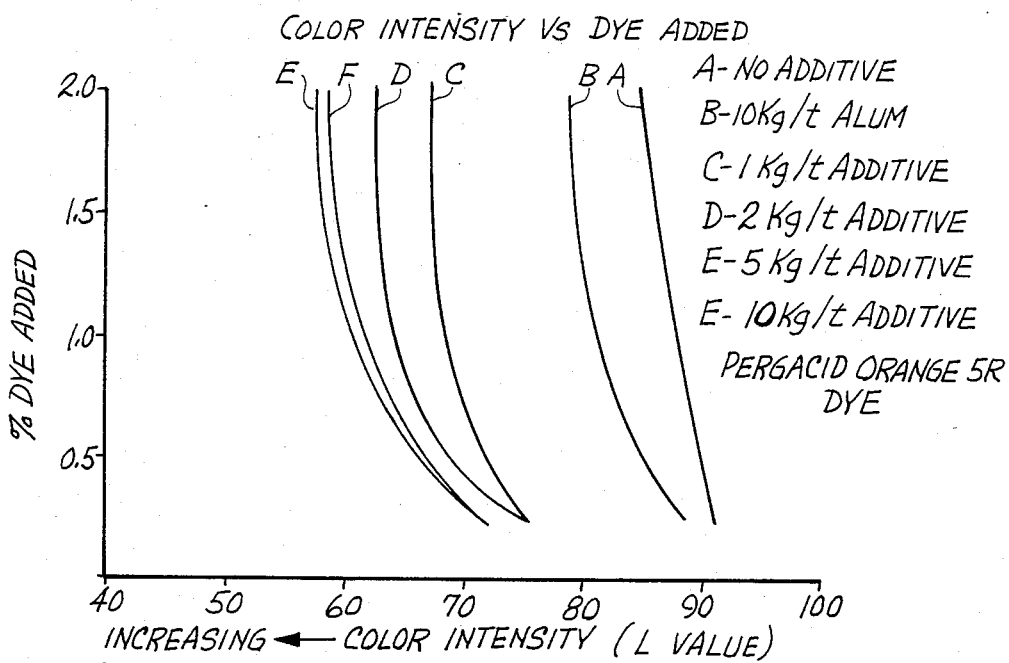

The dye retention efficiency of the cationic cellulose product produced by treating a cellulosic fiber with a condensate of epichlorohydrin and dimethylamine has been demonstrated as shown in FIGS. 1-3. Similar improvements are noted using Epi-DMA condensates modified with ammonia, ethylene diamine (EDA), and hexamethylene diamine (HMDA). These cationic fibers enable the production of papers dyed with acid dyes that have intensities not generally achieved before the discoveries of the present invention. However, there is an ancillary but extremely important aspect of the invention which results from the greater efficiency of dye utilization. That is the greatly reduced amount of dye in the white water resulting from papermaking. The high color intensity of this water has represented an extremely serious waste cleanup problem in the past.

Figure 9:
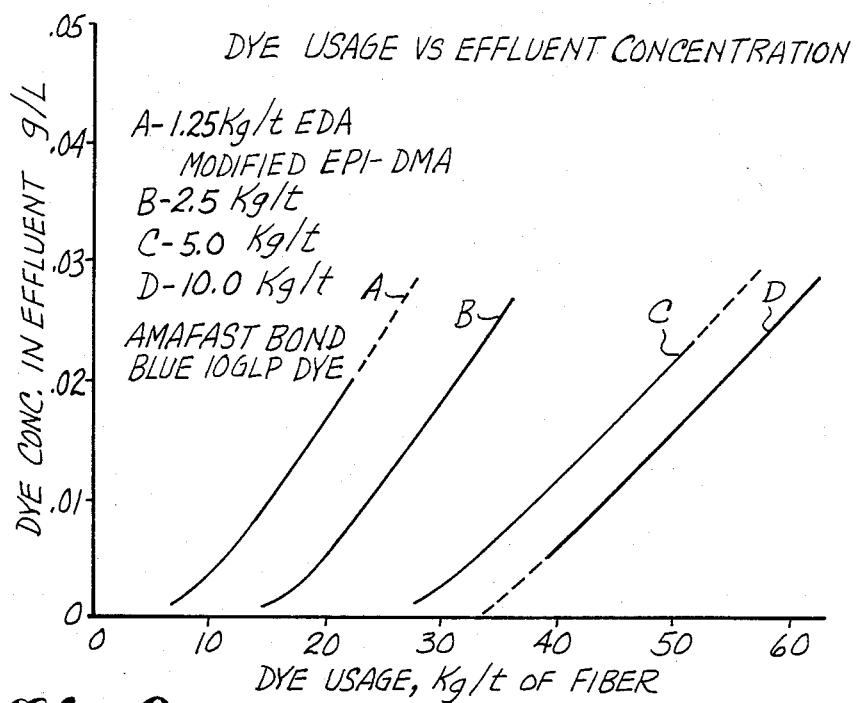

The following examples show the effectiveness of the present cationic fiber at reducing dye in effluent. Bleached kraft fiber was treated as in Example 7 with hexamethylene diamine (HMDA) modified epichlorohydrin-dimethylamine condensate using 5, 10, 15, 20, 25 and 30 kg/t, active material basis, of the condensate based on dry pulp. A sample of 5 g of the treated fiber was beaten in a high shear blender in 1000 mL of water for 2 minutes. Amafast Bond Blue 10 GLP dye was then added. After the dye was dispersed, a 200 mL sample of the pulp slurry was taken and filtered on a cellulose filter paper on a Buchner funnel. The effluent was analyzed colorimetrically using a set of known standards to determine dye content. Results showing the amount of dye in the effluent white water are shown in FIG. 8. Results of a similar test series using ethylene diamine modified Epi-DMA condensate as the additive are given in FIG. 9.

In all cases in this example in excess of 92% of the dye was adsorbed by the cationic cellulose product. This compares with untreated cellulose fiber run as a control in which only about 76-84% of the dye was adsorbed. These results are remarkable since many of the dye concentrations used with treated fiber in this test are far greater than would ever be considered practical for commercial use. Typical dye usage in a paper mill to produce a deep dyed product is about 5-10 kg/t.

Since there was some adsorption of dye by the filter paper used to retain the dyed fiber, a series of tests was made using dye alone. With dye concentrations equivalent to 5, 10 and 20 kg/t, from 91-93% of the original dye was recovered in the effluent. This shows that adsorption by the filter paper was of minor significance.

EXAMPLE 12

The following example shows the effect of pH on pickup efficiency of the Epi-DMA condensate. A series of samples was made in which bleached spruce kraft pulp was treated with 10 kg/t, active material basis, of a hexamethylene diamine modified Epi-DMA condensate (Nalco 7135) at various pH levels between 7 and 10.5, according to the procedure of Example 1. The treated fiber was drained and washed and then reslurried in water. Pergacid Blue Black B dye (Ciba-Geigy) was added to each fiber sample at a rate of 40 kg/t and handsheets were made. The following results were obtained.

TABLE III

| Fiber Treatment pH | Color Intensity, L Value | Kjeldahl N, % | Cationic Additive Retention, % |
|---|---|---|---|
| 7 | 44.5 | 0.018 ± 0.006 | 35 |
| 8 | 41.5 | — | — |
| 9 | 42.0 | — | — |
| 10 | 38.0 | — | — |
| 10.5 | 33.8 | 0.058 ± 0.001 | 112 |

There appears to be an approximately linear relationship between color intensity and treatment pH over the range studied. Because of the high level of condensate retained at pH 10.5, as seen by nitrogen determination, there is little advantage seen in using a higher treatment pH.

In addition to the dyes, latices, and pigments described in the previous examples, the cationic fibers of the present invention would be expected to be advantageous for retention of many other papermaking additives. Included among these might be sizes, fillers, and wet strength additives. It will be understood by those skilled in that art that consideration must be given to the overall chemistry of the system and that the cationic fibers will not necessarily perform in a superior manner with all possible additives. It has already been seen that there are differences in performance between the various species of Epi-DMA condensates. While theoretical predictions can be made, much of papermaking remains a poorly understood art and expectations are not always borne out by results. An example of this is the surprising synergism seen in latex retention when small quantities of alum are used with the cationic cellulose product.

EXAMPLE 13

The following example shows the performance of bleached kraft fiber treated with two types of Epi-DMA condensate and with two types of wet strength additive. The treated products were dyed and qualitative observations made on color intensity.

The cationic cellulose product was made by dispersing 100 g, oven-dry basis, of a sheeted bleached kraft spruce pulp in water at 1.5% consistency using a propellor-type mixer and British disintegrator. To successive 100 g pulp batches, 0.38, 1.00 and 2.00 g of as is hexamethylene diamine modified Epi-DMA condensate (Nalco 7135, 50% solids) was added. This corresponds to as is usages of 10 and 20 kg/t. A similar sample was made using 115 g oven-dry equivalent of kraft fiber to which was added 1.15 g of uncrosslinked Epi-DMA condensate (Nalco 7655, 50% solids material), corresponding to 10 kg/t as is usage. The treated fiber slurries were allowed to stand 30 minutes without agitation. Then the fiber was washed to a pH of approximately 7, sheeted and dried.

The above handsheets were divided into 10 g, oven-dry basis portions, reslurried in about 750 mL of water and agitated for 2 minutes in a high shear blender to simulate beating. The wet strength agent was then added and stirred by hand for 1 minute. Finally, a solution of Amafast Bond Blue 10 GLP dye was added at a 20 kg/t usage equivalent. The slurry was again stirred by hand for 1 minute after which handsheets were made.

Two different wet strength agents were used. The first was a highly cationic polyamine-epichlorohydrin condensate (SR-31, Monsanto Company, St. Louis, Mo.). The other was an experimental weakly cationic resin (CX-252 Nalco Chemical Co., Oak Brook, Ill.). SR-31 is sold as a 35% solids liquid and CX-252 as a 6% solids liquid. The SR-31 wet strength agent was added to attain equivalent usages of 2.5, 5 and 10 kg/t while the CX-252 material was added at 2.5 and 5 kg/t, when used with the HMDA crosslinked Epi-DMA treated fiber. Each wet strength agent was used at only 10 kg/t when used with the unmodified Epi-DMA treated fiber.

Handsheets were tested for wet and dry tensile strengths and the ratio of the two values calculated. Higher ratios indicate better wet strengths. Results are shown in the following tables.

TABLE IV

Ratio of Wet to Dry Tensile Strengths × 100
SR-31 Wet Strength Agent

| Cationic Material | Cationic Material Usage, kg/t | Wet Strength Agent, kg/t | | |
|---|---|---|---|---|
| | | 2.5 | 5 | 10 |
| HMDA Modified Epi-DMA | 5 | 10.49 | 11.86 | 16.52 |
| HMDA Modified Epi-DMA | 10 | 8.94 | 12.76 | 11.88 |
| HMDA Modified Epi-DMA | 20 | 10.91 | 12.23 | — |
| Unmodified Epi-DMA | 10 | 9.45 | 14.26 | 15.97 |
| None | 0 | 6.46 | 7.52 | 12.79 |

TABLE V

Ratio of Wet to Dry Tensile Strengths × 100
CX-252 Wet Strength Agent

| Cationic Material | Cationic Material Usage, kg/t | Wet Strength Agent, kg/t | |
|---|---|---|---|
| | | 2.5 | 5 |
| HMDA Modified Epi-DMA | 5 | 9.45 | 10.33 |
| HMDA Modified Epi-DMA | 10 | 8.76 | 10.60 |
| Unmodified Epi-DMA | 10 | 9.01 | 10.86 |
| None | 0 | 11.74 | 13.58 |

These results show that under the conditions of these trials, the polyamine-epichlorohydrin wet strength agent, in combination with the cationic cellulose product, gives superior performance as compared with unmodified cellulose fiber. On the other hand, the mildly cationic wet strength agent performed better with unmodified fiber. As a qualitative observation, the color intensity of the dyed sheets was inversely related to the amount of wet strength agent used.

EXAMPLE 14

A sample of chlorinated Douglas-fir pulp was obtained from a pulp mill bleach plant. Chlorination is the first of a five-stage bleach sequence as outlined in Example 2. The final four stages of the sequence were completed in the laboratory. In this example, hexamethylene diamine modified Epi-DMA (Nalco 7135) was added at the neutral hypochlorite stage to see if it would remain on the pulp through the balance of the bleaching process. The chlorinated pulp was slurried in water and the equivalent of 2.5 kg/t NaOH added. The pH increased to 11.9. Sodium hypochlorite solution equivalent to 15 kg/t was added. The pH of the mixture dropped to 10.3. At this point, the HMDA modified Epi-DMA condensate was added at an equivalent usage of 10 kg/t active material. The bleach was continued for 60 minutes at a temperature about 37° C. Following washing, hypochlorite, alkaline extraction and chlorine dioxide treatments were given as described previously.

Nitrogen analysis of the fully bleached pulp showed a N content of 0.008%, equivalent to about 15% retention of the added condensate. It is apparent that while some of the cationic polymer is retained by the cellulose much is lost in either or both of the hypochlorite stages. It is thus preferred to add the Epi-DMA condensate after any hypochlorite treatments and at a later alkaline stage in the bleaching sequence. This would normally be the caustic extraction step in a five-stage sequence or the hydrogen peroxide step if one is used.

The cationic nature of the product of the invention appears to be permanent; i.e., essentially unaffected by any of the normal papermaking processes, many of which tend to remove the usual cationic "additives" used in papermaking.

It will be readily apparent to those skilled in the art that many product variations can be made that will be considered to be within the scope of the invention. One of the principal advantages of the present invention is that the degree of cationicity in the product can be readily varied. This is accomplished very simply by adjusting the amount of condensate added to the fiber. As shown in the examples, the final properties of the pulp will be somewhat dependent upon the particular modification of the epichlorohydrin-dimethylamine condensate used to modify the cellulose. It will also be evident that because of its extreme simplicity, many process variations can be made without departing from the scope of the invention. While it is preferred that the condensate be added during a relatively highly alkaline stage near the end of the bleach sequence, this is not absolutely essential and many variations are possible. It is further preferred that the condensate be added later than any bleaching stage in which chlorine or sodium hypochlorite is present.

One of the major advantages of the present invention is that acid dyes such as the tartrazine types can now be used for producing dyed papers without any need for retention aids. The acid dyes as a class are desirable because their high tinctorial values would otherwise enable less dye to be used to attain a given color level. The need for alum and the acidic conditions which it promotes is no longer necessary when making a dyed product using the cationic material of the present invention.

Another significant advantage of the present invention is the improved pigment retention characteristics which dictate that either no alum or much less alum or other retention aid is necessary for a given level of paper opacity. In part, this is due to the fact that the cationic cellulose of the present invention can apparently attain higher levels of cationicity that is possible with the use of external retention aids.

Since many other features of the invention other than those disclosed above will be apparent to those skilled in the art, the invention is to be considered limited only as it is defined by the following claims.

What is claimed is:

1. A method of making a cationic bleached cellulose product which comprises adding to an alkaline stage of a fiber bleaching sequence at least 0.5 kg/t based on the dry weight of the cellulose present of a cationizing agent selected from the group consisting of crosslinked and uncrosslinked condensates of epichlorohydrin and dimethylamine, and mixtures thereof wherein the crosslinking agent, if present, is selected from the group consisting of ammonia and a primary aliphatic diamine of the type $H_2N-R-NH_2$ where R is an alkylene radical of from 2 to 8 carbon atoms.

2. The method of claim 1 wherein said bleaching sequence includes at least one hypochlorite stage and the condensate treatment is later than the last hypochlorite stage.

3. The method of claim 2 in which the bleaching sequence includes an alkaline extraction treatment following the last hypochlorite stage and the condensate treatment is made during the alkaline extraction stage.

4. The method of claim 3 in which the alkaline extraction stage is followed by a chlorine dioxide stage.

5. The method of claim 2 in which the bleaching sequence includes an alkaline peroxide bleaching stage following the last hypochlorite stage and the condensate treatment is made during the alkaline peroxide bleaching stage.

6. The method of claim 1 in which the treatment is made with a condensate having essentially equimolar portions of epichlorohydrin and dimethylamine.

7. The method of claim 6 in which up to 30 molar percent of the dimethylamine is replaced by ammonia.

8. The method of claim 6 in which up to 30 molar percent of the dimethylamine is replaced by ethylene diamine.

9. The method of claim 6 in which up to 30 molar percent of the dimethylamine is replaced by hexamethylene diamine.

10. The method of claim 1 which further comprises using the condensate in an amount 0.5–20 kg/t based on the dry weight of cellulose present.

11. The method of claim 10 which further comprises using the condensate in an amount of 1–10 kg/t based on the dry weight of the cellulose present.

12. The method of claim 1 in which the pH of the bleaching stage at which the condensate is added is at least 9.5 or higher.

* * * * *